(12) United States Patent
Frei

(10) Patent No.: US 6,354,842 B1
(45) Date of Patent: Mar. 12, 2002

(54) ROLLING TOY WITH MOTION RECORDING AND PLAYBACK CAPABILITY

(75) Inventor: Philipp A. Frei, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/522,163

(22) Filed: Mar. 9, 2000

(51) Int. Cl.⁷ .......................... G09B 19/16; A63H 17/25
(52) U.S. Cl. .................. 434/365; 434/258; 446/436; 446/456
(58) Field of Search ................ 446/175, 409, 446/436, 456; 119/702, 707; 434/365.1, 239, 300, 302, 305, 258

(56) References Cited

U.S. PATENT DOCUMENTS

| | | | | |
|---|---|---|---|---|
| 3,583,096 A | * | 6/1971 | Stubbman | 446/459 |
| 4,080,602 A | * | 3/1978 | Hattori et al. | 340/825.72 |
| 4,112,615 A | * | 9/1978 | Ishimoto | 446/456 |
| 4,277,909 A | * | 7/1981 | Rainwater | 446/289 |
| 4,654,659 A | * | 3/1987 | Kubo | 340/825.76 |
| 4,964,837 A | * | 10/1990 | Collier | 446/409 |
| 5,697,829 A | * | 12/1997 | Chainani et al. | 446/436 |
| 6,012,961 A | * | 1/2000 | Sharpe, III et al. | 446/298 |
| 6,027,395 A | * | 2/2000 | Strom | 446/274 |
| 6,039,628 A | * | 3/2000 | Kusmiss et al. | 446/457 |
| 6,083,104 A | * | 7/2000 | Choi | 463/6 |
| 6,250,987 B1 | * | 6/2001 | Choi | 446/436 |

FOREIGN PATENT DOCUMENTS

GB 2119267 A * 11/1983

* cited by examiner

Primary Examiner—Joe H. Cheng
Assistant Examiner—Kathleen M. Christman
(74) Attorney, Agent, or Firm—Testa, Hurwitz & Thibeault, LLP

(57) ABSTRACT

A rolling device in the form of a two-wheeled toy can record and play back physical motion. In a "training mode," the user grasps the device and draws it along a surface on a desired path. The motion is sensed and recorded in an internal memory. In a "playback mode," the previously imparted motion is repeated—i.e., executed by internal circuitry based on the recorded motion, preferably over and over.

21 Claims, 3 Drawing Sheets

ROLLING TOY WITH MOTION RECORDING AND PLAYBACK CAPABILITY

FIELD OF THE INVENTION

The present invention relates to computational toys, and in particular to a rolling toy with motion recording and playback capability.

BACKGROUND OF THE INVENTION

Most toys designed to teach children about computers, programming, and mathematics operate on the computer screen. While such environments can be stimulative and encourage learning, they are nonetheless an abstraction; the child remains removed from the action as a spectator. By contrast, well-designed physical objects can be more effective learning tools for a variety of reasons. First, unlike a computer, which is intended for general usage, a learning device may be designed with a particular problem in mind. Second, a physical object "lives" in the child's world—not in an abstract environment that cannot be directly manipulated. Indeed, the role of physical objects in the development of young children has been studied extensively and shown to positively enhance development. As children handle and manipulate objects, their attentions are more actively engaged, allowing them to iterate actions and thereby explore the complex concepts behind their actions; particularly in the case of computational learning, ideas that would otherwise be remote and abstract can intuitively "come to life" through physical interaction. Unfortunately, the range of manipulatives that teach computational concepts remains limited.

DESCRIPTION OF THE INVENTION

BRIEF SUMMARY OF THE INVENTION

The present invention is an autonomous rolling device in the form of a two-wheeled toy that can record and play back physical motion. The device gives children an intuition for the concepts of functional programming, program execution, vector geometry, and differential geometry through physical manipulation. In a "training mode," the child grasps the device and draws it along a surface on a desired path. The motion is sensed and recorded in an internal memory. In a "playback mode," the previously imparted motion is repeated—i.e., executed by internal circuitry based on the recorded motion, preferably over and over. The recorded motion need not be limited simply to the path (i.e., the trajectory) along which the device is drawn; instead, the invention may be configured to sense the velocity, acceleration and, if desired, higher-order motion parameters, as well as pauses along the path, thereby replicating the intricacies of the training motion.

Thus, a rolling device in accordance with the invention may comprise a housing provided with a pair of wheels depending therefrom, each driven by a (preferably bidirectional) motor. The rotation of each wheel is monitored by a sensor capable of recording an angular position. This position is recorded in a timestamped fashion at uniform, frequent intervals during the training mode. Naturally, the more samples that are acquired, the greater will be the resolution of the recording and the fidelity of playback.

The device may be configured to replicate the recorded motion in a forward and/or reverse direction. By repeating the motion in reverse, the device executes a "boomerang" motion that brings it back to its starting point, from which it may move forward again. In addition, the motion can be speeded, slowed, enlarged, or reduced, as well as interrupted. The device may also be equipped with various accessories, such as a pen that will draw on the surface along which the device moves; environmental sensors (such as bump sensors) that detect a condition and, based thereon, vary the path taken by the device; audio circuitry to add an aural dimension to the device's capabilities; and communication circuitry to permit movement programming via a computer or by exchange of data with another device.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Refer first to FIG. 1, which illustrates a simple embodiment of the invention indicated generally at 100. The device 100 includes a smooth, easily grasped housing 110 having a generally domed or oblate contour. The housing 110 may, for example, be fabricated from colored plastic. A pair of drive wheels $115_1$, $115_2$ extend below the flat bottom panel 125 of housing 110. The shafts on which wheels $115_1$, $115_2$ turn, however, are within the housing. The operating controls for the invention may be as simple as a pushbutton 130 and a display LED 135. The advantage of such a simple interface is rapid familiarity with the device's operation; children quickly learn to create intricate gestures with the device 100, which they can refine through iteration.

Figure 2:
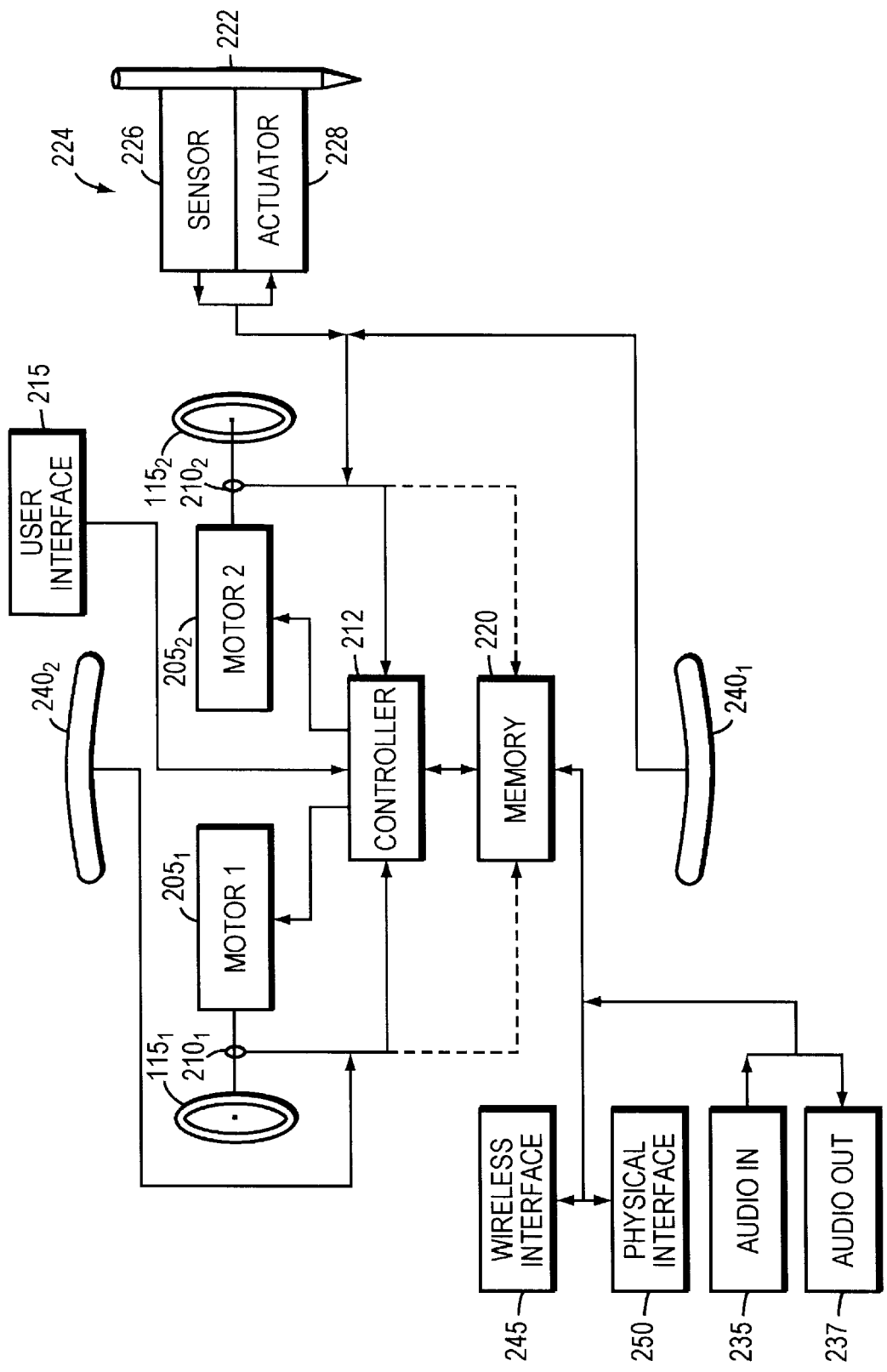
FIG. 2 is a schematic view of the invention showing various optional features.

The operative components of the invention are shown schematically in FIG. 2. Each wheel $115_1$, $115_2$ is connected via a shaft to a respective electric motor $205_1$, $205_2$. For example, motors 205 may be 10-watt, bidirectional DC motors. Employing such relatively large motors contributes useful mass, which helps in creating sufficient friction for the drive wheels 115 and provides some damping to the device 100 during playback. (Such mass can alternatively be furnished by batteries or simply by dead weight added to the device 100.) Preferably, the wheel shafts are collinear, allowing the device 100 not only to move forward and backward, but also to rotate freely about its center. An optical encoder $210_1$, $210_2$ is associated with each of the wheels $115_1$, $115_2$ and monitors the angular position of the respective wheel or its shaft. The output signals from optical encoders 210 are fed to a controller 212, which also controls motors 205 and generally governs operation of the device 100. A user interface 215 facilitates external interaction with the device and, in particular, with controller 212. As noted above, interface 215 may be as simple as a pushbutton and light, but may also take more complex forms as described hereinafter.

In training mode, as rolling of the device 100 causes wheels 115 to rotate, the angular position is fed continuously to controller 212 at a sample rate characteristic of the encoders 210; for example, a typical encoder may have a resolution of 500 counts/revolution, which may be increased or decreased depending on the gearing. Controller 212 may include a microprocessor and/or a microcontroller, such as a proportional integral differential (PID) controller. Controller 212 reads to and writes from a memory 220, which may be a random-access memory, a flash memory, an eraseable programmable memory, or some combination depending on the implementation and desired capability. For example, if the device is to retain recorded motion after it has been turned off, some form of permanent storage is necessary. It may also be necessary to employ a clutch mechanism (not shown) to disengage the motor during training. Moreover, performance on various play surfaces can be improved by making the wheels retractable into housing 110 (through bottom panel 125), and by adding TEFLON sliders (or caster wheels) in front of and behind the wheels 115.

Controller 212 causes the monitored rotations of each shaft to be recorded in memory 220. In order to record not only the absolute rotations of each wheel 115 but also the velocity and acceleration, it is necessary to associate a time with each recorded angular position. This can be accomplished in a variety of ways. Most simply, the encoder information is stored in memory 220 at a fixed clock rate (e.g., 100 Hz), as indicated by the dashed lines; the position of each encoder sample in memory thereby serves as a timestamp, and with sufficient motor torque and adequate motion-control capability on the part of controller 212, the velocity, acceleration, and even higher-order motion parameters associated with the recorded motion can be recreated.

Figure 1A:
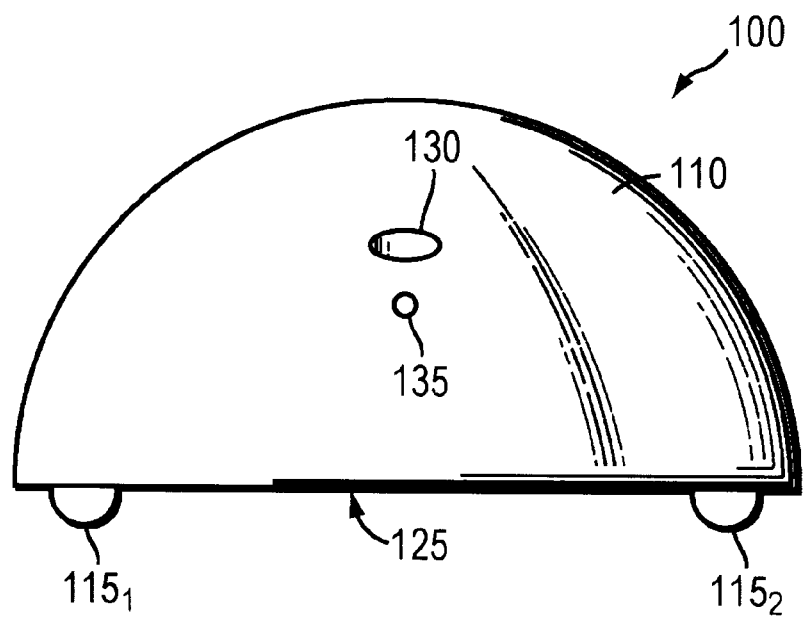
FIGS. 1A and 1B are a front elevational and isometric views, respectively, of a simple embodiment of the present invention.
Figure 1B:
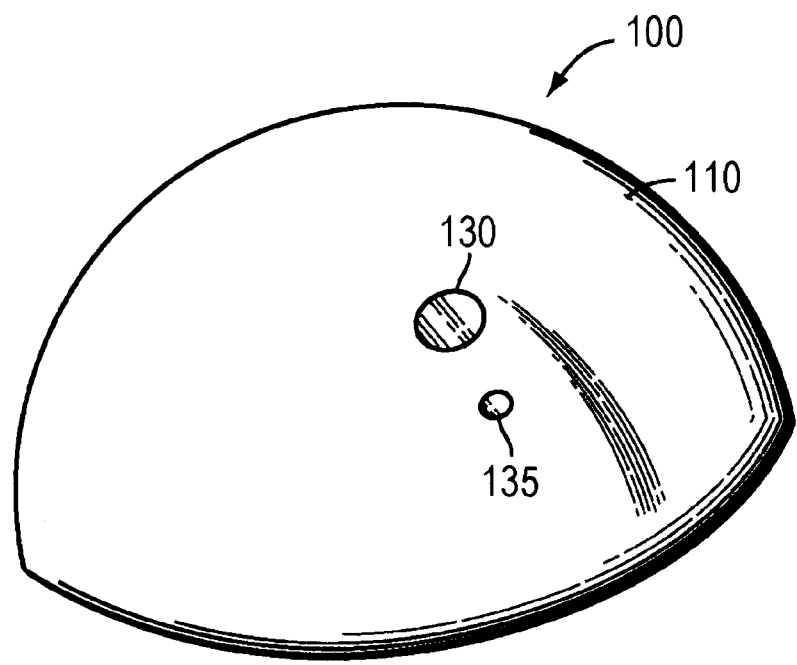

In the simple embodiment shown in FIGS. 1A and 1B, the pushbutton 130 is used to toggle between training and playback modes. To record a gesture, the user presses button 130 and moves the device 100 through a desired path along a surface. LED 135 turns red, and as the device is moved, data from encoders $210_1$, $210_2$ is stored in memory 220. The user presses button 130 a second time to stop recording and begin playback of the recorded gesture. LED 135 now turns green, and controller 212 retrieves the stored data and plays back the gesture through control of motors $205_1$, $205_2$. In particular, controller 212 runs a PID control function that computes the force motors 205 must exert to reach the next recorded control position, continually comparing the current position (from the encoders 210) to the next memory position. Preferably, playback is repeated indefinitely until button 130 is pressed again, at which point LED 135 is turned off and device 100 enters a neutral mode in which nothing is recorded or played back.

Controller 212 is preferably also configured to respond to sustained pressure on button 130 when the device 100 is turned on to enter a "boomerang" mode in which the gesture is repeatedly played back in reverse and then forward directions. Alternatively, the device's on/off switch (not shown) may be a multiple-state component that facilitates selection of various modes including, but not limited to, boomerang mode. For example, the user may choose to slow down, speed up, or spatially enlarge or reduce previously recorded motion. In each case, controller 212 processes the recorded motion in accordance with the selection (altering the velocity in the case of slowed or sped-up motion, and expanding or shrinking the trajectory in the case of enlarged or reduced motion).

Variations on this simple interface are possible. For example, controller 212 may be configured to respond to a double-click of button 130 to override and re-start the record or playback mode. Alternatively, two separate buttons may be employed, one to initiate the record mode and the other to initiate the playback mode.

It is also possible to modify the PID variables of controller 212 to give the device 100 different "personalities." For example, reducing the damping causes the device 100 to overshoot the recorded gesture, behaving as though trying to "catch up" with the gesture. Increasing the damping causes the device 100 to reproduce the recorded gesture more coarsely, eliminating small details (or larger aspects of very slow motions). Device 100 can also be programmed so that these variables change over time, or so that the most appropriate variables are used in particular situations. For example, if slow motion is detected, the device would suppress overdamping, and perhaps even reduce the damping below the normal level. By changing the PID variables over time, the programming can make the device 100 appear to be "learning."

Figure 3:
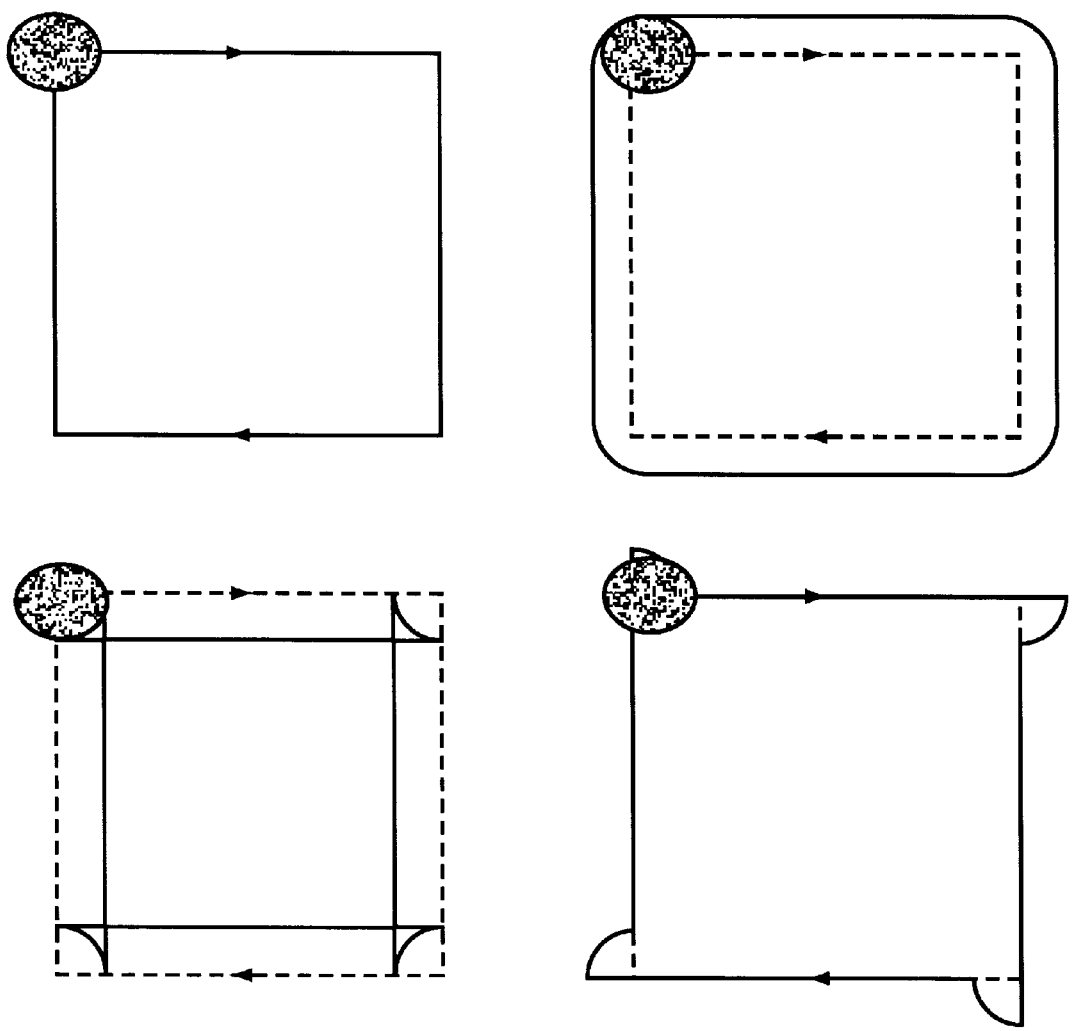
FIG. 3 illustrates the effect of varying the position of a pen attached to the device.

The device 100 may also include any of various accessories. For example, a pen 222 may be held within a bracket 224 mounted to body 110. As shown in FIG. 3, the circumferential position of the pen relative to the wheels and the direction of motion can produce different recorded trails. The patterns that emerge from repeated forward and reverse playbacks can be surprising, encouraging a child to think about the distinction between point-like and extended objects.

Bracket 224 may allow for vertical movement of the pen, so that it is capable of contacting and withdrawing from the surface on which device 100 is rolling. Indeed, the device may be configured to permit the user to lower and retract the pen during recording, and then to replicate this pattern during playback. To implement this function, bracket 224 contains a sensor 224 that monitors the vertical position of pen 222 during recording and feeds this information to controller 212, which records it in a timestamped fashion in memory 220. An electromechanical actuator 228 is responsive to controller 21 2 during playback, lowering or retracting pen 222 in accordance with the recorded information. For example, actuator 228 may be in the form of a solenoid, with pen 222 partly sheathed in a magnetically permeable material and urged upward by a spring; when the solenoid is energized, the sheathed segment of the pen is drawn downward into the coil, causing the pen to write on the surface.

Device 100 may also include audio capability, allowing sounds to be recorded during training and produced in the course of playback. In this case, an audio input module 235 includes a microphone aurally accessible through housing 110 and a digital signal processing (DSP) circuit that transforms analog electrical signals from the microphone to a digital output that is stored, in a timestamped fashion, in memory 220. During playback, an audio output circuit 237, which contains DSP circuitry for converting the digital audio recording into an analog output, drives a speaker audible through housing 110 to replicate the recorded sound.

In addition or alternatively, audio can be prerecorded and coordinated with motion (rather than recorded, along with motion, during training). For example, if the device 100 encounters a wall, applying more and more power to the motors in a futile effort to move forward, the device can be programmed to cause audio output circuit 237 to utter "I'm stuck" in response to this condition. Similarly, if the motion traces a repetitive circular path, the device might recognize this condition and cause circuit 237 to say "I'm dizzy." It is important to recognize that entries in a repertoire of audio responses can be selected not only on the basis of actual motion and encountered conditions, but also by analysis of the motion trajectory, velocity, and acceleration data stored in memory 220. Moreover, music can also be created by the device 100; audio output circuit 237 may be programmed to synthesize a particular instrument, with various motions corresponding to particular musical outputs. For example, if percussion is synthesized, each stop and start of the device can correspond to a beat.

It is possible to configure device 100 for conditional behavior. For example, housing 110 may be provided with two or more bump sensors $240_1$, $240_2$ that sense impact and in response thereto transmit a signal to controller 212. Memory 220 may contain a pre-programmed or user-defined reactive motion sequence to be executed upon receipt of this signal. For example, the device may be programmed to move forward and turn to the right when a rear impact is signaled by sensor $240_1$, and to move backward and turn to the left when a forward impact is signaled by sensor $240_2$. When a bump signal is received by controller 212, it interrupts the current movement, executes the reactive sequence, and resumes playback following the point of interruption. The reactive movement may also be programmed by the user. For example, when the device strikes a wall, controller 212 may interrupt the current movement and turn LED 135 yellow, prompting the user to record a response movement. This movement is retained in memory 220 and becomes the standard response to the event that produced the interruption.

Other types of environmental sensors can be employed in lieu of or in addition to bump sensors—e.g., sensors to light, temperature, electric fields, etc.—that prompt of conditional movement associated with the particular sensor. The conditional movement may be context-dependent. For example, an electric-field sensor can detect proximity of the user's hand, and in response, controller 212 may be configured to cause the device 100 to move away from the user. This new motion may be introduced into the recording, so that when the gesture is again played back, the added motion is included. This allows recorded motion to be "edited" during performance, eliminating the need for complete re-recording to make a minor change.

The device 100 can be configured to permit exchange of the information contained in memory 220 with another such device, or with a computer. For example, memory 220 may be in the form of a removable cartridge that may be inserted into any device 100. Alternatively or in addition, device 100 may include an interface 245 that permits wireless communication with another device 100 and/or with a computer. For example, interface 245 may be a radio-frequency (RF) or infrared (IR) transceiver driven by controller 212 to either transfer all or a portion of the contents of memory 220 to a similarly equipped external device, or to receive from such a device data that is subsequently stored in memory 220. Finally, device 100 may include a physical interface 250, such as a parallel or serial port, that facilitates uploading of data from memory 220 to, or downloading data from, a computer or other external device.

Data exchange can facilitate numerous capabilities and enhancements to device functionality. For example, recorded motion transferred to a computer may be represented on the computer screen and edited visually, and the edited motion returned to the device's memory 220. Thus, simple sequences can be combined, or a single sequence can be pruned or repeated. Music or other audio may also be added. Data-exchange capability allows recorded motion (whether or not edited) to be shared and exchanged, via the Internet, with owners of other, similar devices.

Although the present invention has been described with reference to specific details, it is not intended that such details should be regarded as limitations upon the scope of the invention, except as and to the extent that they are included in the accompanying claims. For example, in addition to toy implementations, the approach of the present invention may be used to implement tools for choreographers and animators. Moreover, the housing take various forms other than that shown, ranging from cars to fuzzy animals.

What is claimed is:

1. A rolling device comprising:
   a. a housing comprising first and second wheels projecting therefrom and being adapted for rolling on a surface;
   b. first and second motors for driving the first and second wheels, respectively;
   c. first and second sensors for monitoring rotation of the first and second wheels, respectively, in a training mode with the motors inactive;
   d. a memory, responsive to the sensors, for recording the monitored wheel rotations; and
   e. a controller, operatively coupled to the memory and to the motors, for operating the motors in a playback mode so as to replicate the recorded rotations.

2. The device of claim 1 wherein the controller is also operatively coupled to the sensors, the controller capturing, in the training mode, a series of instantaneous angular wheel positions and a time associated with each position, the controller thereby computing and storing in the memory and subsequently replicating, in the playback mode, a trajectory, velocity, and acceleration for each wheel.

3. The device of claim 1 wherein the motors are bidirectional and rotation is monitored in forward and reverse rotational directions.

4. The device of claim 3 wherein the controller is further configured to replicate the recorded rotations in forward and reverse rotational directions.

5. The device of claim 1 further comprising an environmental sensor operative during the playback mode, the controller being responsive to the environmental sensor and interrupting playback of the recorded rotations upon occurrence of a predetermined environmental condition.

6. The device of claim 5 wherein the environmental sensor comprises at least one bump sensor.

7. The device of claim 5 wherein the memory stores a reactive rotational sequence, the controller operating the motors to execute the reactive rotational sequence upon occurrence of the environmental condition and, following playback of the reactive rotational sequence, causing resumed playback of the recorded rotations.

8. The device of claim 1 further comprising a pen, attached to the housing, for writing on the surface.

9. The device of claim 8 wherein the pen is attached to the housing by means of a bearing member, the bearing member permitting the pen to be moved along an axis and comprising:
   a. a sensor for sensing a pen position along the axis; and
   b. an actuator, responsive to the controller, for moving the pen along the axis, the memory recording changes in the pen position in the training mode, and the controller operating the actuator to replicate the recorded changes in the pen position during the playback mode.

10. The device of claim 1 further comprising a microphone, a speaker, and an audio circuit, the memory recording signals from the microphone in the training mode and the audio circuit causing the signals to be played through the speaker during the playback mode.

11. The device of claim 1 wherein the memory is physically removable from the housing.

12. The device of claim 1 further comprising a communication circuit for (i) transmitting to an external receiver the recorded monitored wheel rotations stored in the memory and (ii) receiving from an external source a sequence of wheel rotations for storage in the memory and subsequent playback by the controller.

13. The device of claim 12 wherein transmission and reception are wireless.

14. The device of claim 13 wherein the communication circuit comprises an infrared transceiver.

15. The device of claim 13 wherein the communication circuit comprises a radio-frequency transceiver.

16. The device of claim 12 wherein the communication circuit comprises a computer interface and a connector facilitating data exchange with a computer.

17. The device of claim 1 wherein the housing is smooth and graspable.

18. The device of claim 1 wherein the controller is configured to replicate the recorded rotations in a speeded-up or slowed-down fashion upon command.

19. The device of claim 2 wherein the controller is configured to replicate the recorded rotations so as to expand or reduce the trajectory upon command.

20. The device of claim 2 wherein the controller implements a damping factor and is configured to increase or decrease the damping factor upon command.

21. The device of claim 1 further comprising a speaker and an audio circuit, the memory comprising prerecorded audio information, the audio circuit causing the information to be played through the speaker during the playback mode.

* * * * *